United States Patent [19]

Bradford

[11] 4,345,785

[45] Aug. 24, 1982

[54] DIELECTRIC PIPE COUPLING FOR USE IN HIGH TEMPERATURE, CORROSIVE ENVIRONMENTS

[75] Inventor: Randol W. Bradford, Waggaman, La.

[73] Assignee: Freeport Minerals Company, New York, N.Y.

[21] Appl. No.: 198,293

[22] Filed: Oct. 20, 1980

Related U.S. Application Data

[63] Continuation of Ser. No. 8,112, Jan. 31, 1979, abandoned.

[51] Int. Cl.³ .............................................. F16L 59/14
[52] U.S. Cl. ...................................... 285/50; 285/55; 285/286; 285/404
[58] Field of Search ................... 285/149, 422, 48, 49, 285/50, 52, 53, 54, 90, 404, 286; 228/44.1 R, 44.5

[56] References Cited

U.S. PATENT DOCUMENTS

| | | | |
|---|---|---|---|
| 764,603 | 7/1904 | Lambert | 285/48 X |
| 1,308,853 | 7/1919 | McVoy | 285/404 X |
| 2,848,254 | 8/1958 | Millar | 285/149 |
| 2,950,928 | 8/1960 | Bowan | 285/52 |
| 3,018,119 | 1/1962 | Champion | 285/50 |
| 3,028,180 | 4/1962 | Smith | 285/404 X |
| 3,432,186 | 3/1969 | Braun | 285/53 |
| 3,593,402 | 7/1971 | Mori | 228/44.5 |

FOREIGN PATENT DOCUMENTS

| | | | |
|---|---|---|---|
| 2610996 | 9/1977 | Fed. Rep. of Germany | 285/54 |
| 446831 | 3/1968 | Switzerland | 285/50 |

Primary Examiner—David Arola
Attorney, Agent, or Firm—Fisher, Christen & Sabol

[57] ABSTRACT

A pipe coupling is disclosed for connecting two pipelines of different materials together in a high temperature, corrosive environment which, at the same time, prevents deterioration of the pipelines due to galvanic action. The coupling achieves its purpose by using a relatively rigid insulating material to prevent contact between the pipelines. It also achieves high pullout resistance while maintaining minimum outer dimensions to facilitate its use in all types of wells, such as oil, gas, sulfur, etc.

4 Claims, 3 Drawing Figures

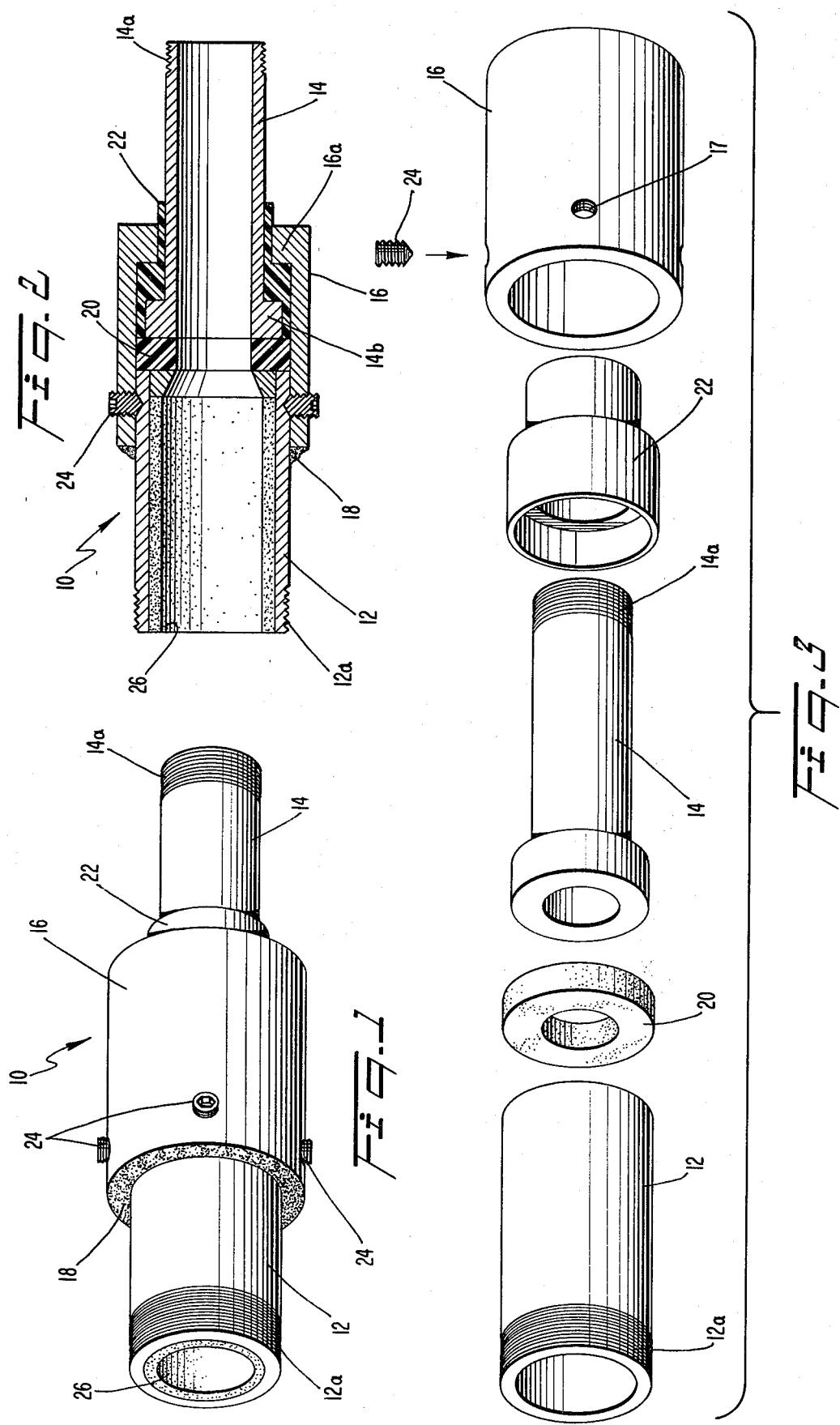

DIELECTRIC PIPE COUPLING FOR USE IN HIGH TEMPERATURE, CORROSIVE ENVIRONMENTS

CROSS-REFERENCE TO RELATED APPLICATION

This application is a continuation of my copending application, Ser. No. 008,112, filed Jan. 31, 1979, now abandoned.

BACKGROUND OF THE INVENTION

1. Field of the Invention

This invention relates to pipe couplings, more particularly dielectric pipe couplings used in high temperature, corrosive environments.

2. Brief Description of the Prior Art

For many years the oil, sulfur and gas industries have been faced with the problem of combating corrosion in their underground wells and associated surface piping caused by the hot, corrosive fluids encountered in normal well operation. Exposure of the steel pipes, tube and casings to these fluids obviously decreases the lifespan and increases the maintenance costs associated with the wells. In cases where a well exhibits marginal production, the increases maintenance costs could determine whether or not the well is kept in production.

A typical proposed solution to minimize the effects of corrosion is to coat the interior of the pipe and to cement the outside into the well formation. Obviously, this solution is imperfect since it prohibits removal of the pipe for remedial work on the well. Another solution is to use stainless steel or other corrosive resistant material for the piping. In many cases, however, this solution is economically impossible due to the much higher costs of such materials.

A more viable solution to the problem is to use the corrosive resistant material, such as stainless steel only through the most corrosive area of the well operation and to join it to a string of mild steel piping used to make up the remainder of the system. However, the corrosive fluids (acid or basic) form an ideal environment for galvanic corrosion between the dissimilar metals. This results in a faster corrosive attack of the mild steel piping and a slower attack of the stainless steel as compared with the same materials when they are not in contact.

Several attempts have been made in the past to eliminate or minimize the galvanic action between dissimilar piping materials. U.S. Pat. Nos. 2,950,928; 3,185,501 and 3,346,274 all show electrically insulating joints for connecting pipes or tubes together. All of these connecting joints utilize at least one resilient insulating member to prevent physical contact between the pipes. This would render it impractical to use them in the high temperature, corrosive environment of a sulfur, oil or gas well due to the rapid deterioration of the resilient element. Also, the inferior pull-out strength of these joints would prohibit their use in a well string or similar piping arrangement. Other insulating pipe couplings are shown in U.S. Pat. Nos. 1,165,114 and 3,871,687. However, neither of these couplings are designed for use in the high-temperature, corrosive environment of an oil, sulfur or gas well.

SUMMARY OF THE INVENTION

The present invention provides a pipe coupling which obviates the foregoing problems associated with the prior art devices, while at the same time is easily installed, simply constructed and provides minimum outer dimensions to greatly facilitate its use in a well-type environment. The coupling according to the invention comprises first and second pipe connecting sections, each made of the same material as the pipes to which they are attached. The second pipe connecting section has a radially extending flange on one end, which is enclosed by a retainer housing attached to the first pipe connecting section. Relatively rigid insulating means is provided so as to prevent any physical contact between the second pipe connecting section and both the first pipe connecting section and the retainer housing. The insulating means is sufficiently rigid to provide a coupling with increased pull-out strength (i.e. force along the longitudinal axis of the coupling tending to pull the first and second pipe connecting sections apart) and at the same time is sufficiently durable to retain its effectiveness at temperatures of up to 400° F., or higher, depending on the material used to fabricate sleeve 22 and washer 20. It has been found that polytetrafluoroethylene, a synthetic resin polymer manufactured by E. I. duPont de Nemours & Co., and sold under the trademark Teflon or similar material has the requisite strength, insulating and high temperature characteristics. The insulating means takes the form of an annular washer inserted between the ends of the first and second pipe connecting sections and a sleeve which fits around the flange of the second pipe connecting section. The insulating means not only prevents any physical contact between the elements of the coupling, but is sufficiently rigid that it prevents the elements from separating when subjected to a tensile loading. This is an important advantage of the present invention since it prevents the corrosive fluid within the pipeline from seeping into the cracks and establishing a galvanic current flow path between the dissimilar metallic elements of the coupling.

It is an objective of the present invention to provide a pipe coupling for use in a corrosive environment at temperatures up to and exceeding 400° F.

It is a further objective to provide such a pipe coupling that is simple in construction and easy to assemble at a well site using conventional drilling rig tools.

It is an additional objective to provide a pipe coupling having a relatively slim exterior so as to minimize disruption of any fluid flow around the exterior of the coupling.

It is a further objective to provide a pipe coupling having increased resistance to "pull out" so as to enable the coupling to support the pipe, tools and appliances that may be suspended below it in a subterranean well bore.

BRIEF DESCRIPTION OF THE DRAWINGS

FIG. 1 is a perspective view of the pipe coupling according to the invention.

FIG. 2 is a longitudinal sectional view of the coupling of FIG. 1.

FIG. 3 is an exploded perspective view of the pipe coupling of FIGS. 1 and 2.

DETAILED DESCRIPTION OF THE PREFERRED EMBODIMENT

The assembled pipe connector according to the invention is illustrated generally by 10 in FIGS. 1 and 2, and comprises first pipe connecting section 12, second pipe connecting section 14 and retainer housing 16.

First and second pipe connecting sections 12 and 14 each have threads 12a and 14a, respectively, for connection with pipelines (not shown). Although external threads 12a and 14a are shown, other means for connecting sections 12 and 14 to pipelines may also be utilized without exceeding the scope of the invention. As can be seen in FIG. 2, pipe connecting section 14 has radially extending flange 14b the purpose of which will be hereinafter described.

Retainer housing 16 has a generally cylindrical shape and is attached to first pipe connecting section 12 by weld 18 or similar means. A series of circumferentially spaced, threaded holes 17 are formed adjacent one end of retainer 16. Annular insulating washer 20 is interposed between the ends of first and second pipe connecting sections 12 and 14, and is dimensioned so as to extend radially outwardly to contact the interior of retainer housing 16. Insulating sleeve 22, having a stepped, annular construction, is located between retainer housing 16 and second pipe connecting section 14 so as to prevent any contact therebetween. As previously stated, annular washer 20 and sleeve 22 are made of a relatively rigid material having electrically insulating qualities. Teflon has been found to provide the requisite rigidity and insulating qualities, but other similar materials may be used without exceeding the scope of the invention.

To assemble the pipe coupling 10, insulating sleeve 22 is first placed into retainer housing 16 such that the larger diameter portion of the sleeve bears against the interior of the retainer housing. Second pipe connecting section 14 is then inserted into the assembly, followed by annular washer 20 and the end of first pipe connecting section 12. Longitudinal compressive pressure is applied against first pipe connecting section 12 and retainer housing 16 and a series of circumferentially spaced, radial holes are drilled partially into first pipe connecting section 12 using holes 17 in housing 16 as a guide. Set screws 24 are threaded into retainer housing 16 and extend partially in first pipe connecting section 12 to retain coupling 10 in assembled relationship. The parts are permanently assembled by welding them together, as at 18. At this point, set screws 24 may be left in position, or removed and existing holes 17 plug welded. The thusly assembled coupling is now ready for use in a well piping system.

The use of a pipe coupling in a subterranean well bore dictates that it have sufficient strength to support the weight of the pipe suspended below it. It must also have adequate strength to be used to activate various tools and appliances positioned below the coupling. In addition to the strength provided by the wall thickness of elements 12, 14, and 16, the instant invention provides additional resistance to "pull-out" by flanges 14b and 16a. Flange 14b has an outer diameter greater than the diameter of the opening defined by inwardly extending flange 16a, thus preventing "pull-out" in all cases except complete failure of the wall materials of retainer housing 16, or pipe connecting section 14. The "pull-out" strength of the coupling can be altered for a particular application by varying the wall thicknesses of the various elements.

For use in sulfur well applications, it has been found satisfactory to fabricate pipe connecting section 14 of stainless steel, and pipe connecting section 12 and retainer housing 16 out of mild steel. Since retainer housing 16 and pipe connecting section 12 are in physical contact with each other they should be made of the same material to avoid galvanic corrosion. Pipe connecting section 12 may have a liner 26 of cement or other inert material so as to prevent corrosion. The pipe connecting sections may be fabricated of any material, but they should be of the same material as the pipelines to which they are to be attached.

The pipe coupling according to the invention has been found to provide satisfactory performance when used at temperatures up to 380° F. Also, the relatively slim exterior profile greatly facilitates its use in sulfur well application where the interior of a pipeline as well as the annular area surrounding it are used to pump fluids into and out of the well. The slim exterior allows maximum fluid flow around the coupling.

The foregoing description is presented for illustrative purposes and should not be construed as in any way limiting. Various modifications may be undertaken without exceeding the scope of this invention.

We claim:

1. A pipe coupling for electrically isolating two adjacent pipes of dissimilar metals included in a string of pipe to be suspended from its upper end in the hostile environment of a well, said string being subject to high differential fluid pressures and elevated temperatures, said coupling being assembled prior to inclusion in said string in situ, comprising:

an assembly of elements including two generally aligned tubular elements of dissimilar metals respectively electrolytically compatible with a respective one of said two adjacent pipes of said string;

each of the respective outer ends of said tubular elements being threaded for connection with a respective one of said two adjacent pipes;

one of said tubular elements being of uniform outside diameter along its length, terminating at its inner end in a transverse surface normal to its axis and comprising the less expensive of said two dissimilar metals;

the inner end of the other of said tubular elements comprising more expensive of said two dissimilar metals and being provided with and outwardly projecting annular flange having an external axial force-transmitting surface and an inner end surface in axial alignment with and parallel to said first-mentioned transverse surface;

an exterior tubular retainer housing overlapping the inner ends of both of said tubular elements comprising a metal electrolytically compatible with said one of the tubular elements;

the interior surface of the housing having a uniform diameter along its length for a sliding fit over the exterior inner end of said one tubular element and terminating at one end in an inwardly directed flange provided with an axial force-transmitting surface axially spaced from said first-mentioned force-transmitting surface;

the inner annular margin of the flange on the housing being of less diameter than the outer diameter of the other of said tubular elements and defining therewith an annular space;

an annular washer of electrically non-conductive synthetic plastic material resistant to deformation and elevated temperature disposed in contact with and under axial compression between said transverse flat surface and said inner end surface of said tubular elements;

a sleeve of electrically non-conductive synthetic plastic material resistant to deformation and elevated temperature disposed between the housing and the other of the tubular elements, a portion of said sleeve filling said annular space and a medial portion of the sleeve having axially spaced radially directed surfaces disposed in axial force-transmitting abutment between said previously-mentioned force-transmitting surfaces; and another portion of said sleeve extending from said medial portion to said annular washer;

temporary fastening means associated with being provided to prevent axial displacement of the housing relative to said one tubular element during assembly when exteriorly applied axial force to compress said washer has been removed prior to final welding, and;

a permanent weldment joining the housing to said one tubular element to retain said washer in sealing engagement in opposition to "pull out" forces exerted on the coupling when connected in a suspended string of pipes.

2. A dielectric coupling as defined in claim 1, wherein said temporary fastening means includes a radially directed threaded aperture provided in the annular wall of said housing and a threaded set screw received in said aperture.

3. A dielectric coupling as defined in either one of claims 1 or 2, wherein said electrically non-conductive material comprises a composition sufficiently durable to retain effectiveness at temperatures up to approximately 400° F.

4. A dielectric coupling as defined in claim 3, wherein said composition comprises polytetrafluoroethylene.

* * * * *